US007463900B2

(12) United States Patent
Wan

(10) Patent No.: US 7,463,900 B2
(45) Date of Patent: Dec. 9, 2008

(54) DISCONTINUOUS RECEPTION METHOD FOR MOBILE COMMUNICATION TERMINAL DEVICE AND MOBILE COMMUNICATION TERMINAL DEVICE

(75) Inventor: Wang Wan, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 559 days.

(21) Appl. No.: 11/082,741

(22) Filed: Mar. 17, 2005

(65) Prior Publication Data

US 2006/0084408 A1 Apr. 20, 2006

(30) Foreign Application Priority Data

Sep. 27, 2004 (JP) .............................. 2004-279916

(51) Int. Cl.
*H04B 7/00* (2006.01)
*H04Q 7/20* (2006.01)

(52) U.S. Cl. ...................... 455/518; 455/520; 455/517; 455/416

(58) Field of Classification Search ................. 455/411, 455/419, 428, 412.1, 416, 414.1, 343.4, 518, 455/519, 510, 517, 520, 516, 528, 415, 450, 455/452.1, 509, 515; 370/335, 352
See application file for complete search history.

(56) References Cited

U.S. PATENT DOCUMENTS

| 5,940,771 | A | 8/1999 | Gollnick et al. | |
|---|---|---|---|---|
| 6,324,397 | B1 | 11/2001 | Adachi et al. | |
| 7,158,502 | B2 | 1/2007 | Harris et al. | |
| 2002/0172169 | A1* | 11/2002 | Rosen et al. | ................ 370/335 |
| 2002/0191583 | A1 | 12/2002 | Harris et al. | |
| 2003/0117968 | A1 | 6/2003 | Motegi et al. | |
| 2005/0143056 | A1* | 6/2005 | Iyer et al. | ................... 455/416 |
| 2005/0164682 | A1* | 7/2005 | Jenkins et al. | ........... 455/412.1 |
| 2006/0116151 | A1* | 6/2006 | Sullivan et al. | ............. 455/519 |

FOREIGN PATENT DOCUMENTS

| CN | 1392693 | 1/2003 |
|---|---|---|
| EP | 0 892 507 A | 1/1999 |
| JP | 2003-179539 A | 6/2003 |
| JP | 2000-515334 | 4/2005 |

OTHER PUBLICATIONS

Keichi Tachikawa, "W-CDMA Mobile Communications Systems"; Maruzen Co., Ltd.; Jun. 25, 2001, pp. 222 and 223—and partial English translation thereof.
Keiji Tachikawa, "W-CDMA Mobile Communications Systems" Maruzen Co. , Ltd. Jun. 25, 2001, pp. 222 and 223.
European Office Action (Communication pursuant to Article 96(2) EPC) in counterpart European Patent Application Serial No. 05 102 153.3 - 2412, dated Jul. 26, 2006, 5 pages.

* cited by examiner

*Primary Examiner*—John J Lee
(74) *Attorney, Agent, or Firm*—Frishauf, Holtz, Goodman & Chick, P.C.

(57) ABSTRACT

A discontinuous reception method for a mobile communication terminal device and a mobile communication terminal device which, when a PTT (Push-to-Talk) system call is provided, make it possible to reduce the amount of electrical power consumed by the mobile communication terminal device and to start a PTT-system telephone call with a short wait time. The mobile communication terminal device performs discontinuous reception in a long discontinuous reception cycle in a standby state when the mobile communication terminal device is not a member of a PTT session (step S14) and performs discontinuous reception in a short discontinuous reception cycle in a standby state when the mobile communication terminal device is a member of the PTT session and the PTT call is in a dormant state (step S23).

12 Claims, 5 Drawing Sheets

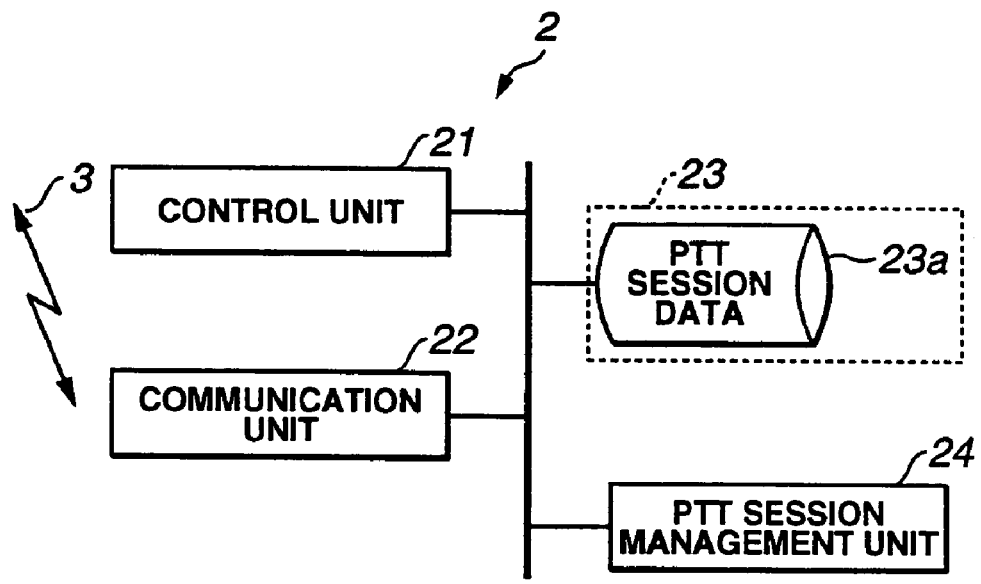

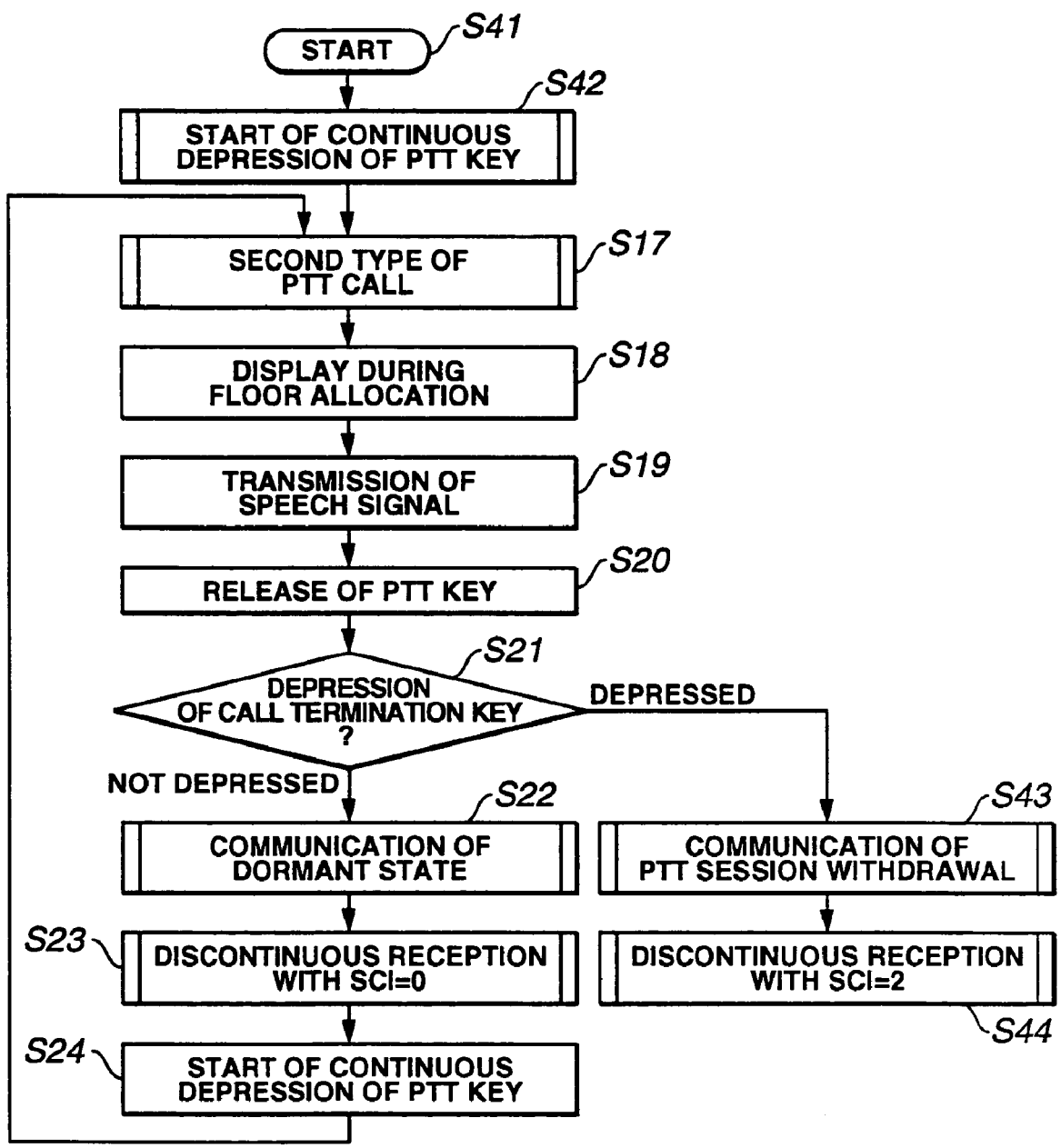

DISCONTINUOUS RECEPTION METHOD FOR MOBILE COMMUNICATION TERMINAL DEVICE AND MOBILE COMMUNICATION TERMINAL DEVICE

CROSS-REFERENCE TO RELATED APPLICATIONS

This application is based upon and claims the benefit of priority from the prior Japanese Patent Application No. 2004-279916, filed on Sep. 27, 2004; the entire contents of which are incorporated herein by reference.

BACKGROUND OF THE INVENTION

1. Field of the Invention

The present invention relates to a discontinuous reception method for a mobile communication terminal device and a mobile communication terminal device and, more particularly, to processing to select a discontinuous reception period.

2. Description of the Related Art

In mobile communication systems using cellular systems such as the CDMA (Code Division Multiple Access) system, the mobile communication service area is divided into small-scale regions known as cells and one or a plurality of base stations are installed in each cell. Further, a mobile station (mobile communication terminal device) is positioned in a certain cell and, during standby (Idle Mode), selects and renders a base station that is installed in this cell as the standby base station (Serving Cell) and establishes a wireless communication link with the standby base station.

Further, the mobile station performs discontinuous reception, waking up discontinuously in each discontinuous reception cycle, receiving system paging information which could be related to an incoming call that is sent by the standby base station and detecting the existence of an incoming call to the mobile station's own station. Further, when there is an incoming call to the mobile station's own station, the mobile station establishes the required channel with the standby base station and performs communications via the established channel. Here, the discontinuous reception cycle is established to fulfill the contrary objectives of reducing the amount of electrical power consumed by the mobile station and of shortening the time required to complete the establishment of a channel in the event of an incoming call (See "W-CDMA Mobile Communication Systems" by Keiji Tachikawa (Ed.); Manuzen Co. Ltd, Jun. 25, 2001, pages 222 to 223, for example).

Meanwhile, a telephone call of the Push-to-Talk (referred to as 'PTT' hereinafter) system in which a user performs a predetermined operation to request the floor in order to make a call and only one mobile station that has obtained the floor can transmit a speech signal and the other one or plurality of mobile. That is to say, to establish a PTT-system telephone call, a certain mobile station needs to request the establishment of a PTT session to connect to the other one or plurality of mobile stations at first, then request the occupation of the floor to speak. A mobile station can invite other online mobile stations to join a PTT session onward by itself, or it can join a PTT session owned by other mobile station by answering to the PTT mobile terminated call from the owner of the session.

That is, when a certain mobile station has requested the establishment of a PTT session, information relating to an incoming call is transmitted by the mobile station to the mobile station that requested participation in the session and, when a certain mobile station that is a member of a certain PTT session has requested the floor, information relating to the incoming call is transmitted to a mobile station that is a member of the PTT session with the exception of this mobile station.

Because the processing for the registration of the mobile station participating in the session takes time, there is no need to focus on the time required until completion of the establishment of a channel in the establishment of a PTT session. Therefore, the discontinuous reception cycle when the mobile station is not a member of the PTT session is suitably set relatively long with a focus on reducing amount of electrical power consumed by the mobile station.

On the other hand, when a certain mobile station requests the floor, the mobile station obtains the floor in an instant and the transmission of the speech signal must be at the start of a telephone call with a short wait time. The discontinuous reception cycle in a case where the mobile station is a member of the PTT session is suitably set relatively short with a focus on shortening the time required to complete the establishment of the channel.

However, the method disclosed in "W-CDMA Mobile Communication Systems" by Keiji Tachikawa (Ed.); Maruzen Co. Ltd, Jun. 25, 2001, pages 222 to 223 mentioned earlier has been faced by the problem of not being able to change the discontinuous reception cycle.

SUMMARY OF THE INVENTION

The present invention was conceived to resolve the above problem and an object thereof is to provide a discontinuous reception method for a mobile communication terminal device and a mobile communication terminal device that make it possible to change the discontinuous reception cycle depending on whether the mobile communication terminal device is a member of a PTT session.

In order to resolve the above object, an aspect of the present invention provides a discontinuous reception method during standby of a mobile communication terminal device having a push-to-talk system call function, the method comprising: waking up discontinuously in a first discontinuous reception cycle when the mobile communication terminal device is not a member of a push-to-talk session; and waking up discontinuously in a second discontinuous reception cycle that is shorter than the first discontinuous reception cycle when the mobile communication terminal device is a member of the push-to-talk session.

According to the present invention, it is possible to provide a discontinuous reception method for a mobile communication terminal device and a mobile communication terminal device in which the discontinuous reception cycle when the mobile communication terminal device is a member of a PTT session is shorter than the discontinuous reception cycle when the mobile communication terminal device is not a member of the PTT session. As a result, it is possible to provide a reduction in the amount of electrical power consumed by the mobile communication terminal device and to provide a start for a telephone call of a PTT system with a short wait time.

BRIEF DESCRIPTION OF THE DRAWINGS

FIG. 3 is a block diagram showing the constitution of a PTT server device according to the embodiment of the present invention;

FIG. 4 shows the format of PTT session data according to the embodiment of the present invention;

FIG. 7 is a flowchart showing the operation of the control unit of the mobile communication terminal device according to the embodiment of the present invention (the third of which is the making of a PTT-system call in the PTT session in which the mobile communication terminal device is participating)

DETAILED DESCRIPTION OF THE INVENTION

Figure 1:
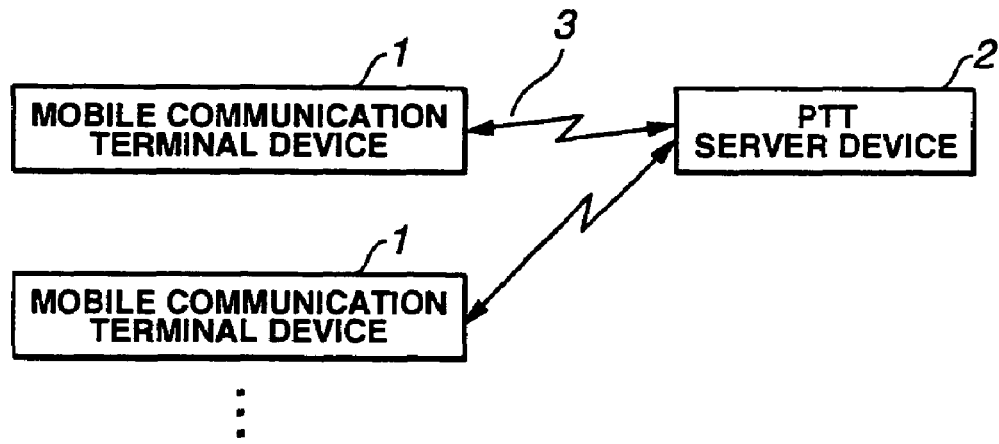
FIG. 1 is a block diagram showing the constitution of a PTT-system calling system according to an embodiment of the present invention.

Embodiments of a discontinuous reception method for a mobile communication terminal device and a mobile communication terminal device according to the present invention will be described hereinbelow with reference to the drawings. FIG. 1 is a block diagram showing the constitution of a PTT-system calling system that comprises the mobile communication terminal device according to the embodiment of the present invention to which the discontinuous reception method for a mobile communication terminal device according to the embodiment of the present invention is applied.

The PTT-system calling system comprises a plurality of mobile communication terminal devices 1, a PTT server device 2 that manages a PTT session in which a plurality of mobile communication terminal devices 1 are participating, and a wireless communication network 3 that connects the mobile communication terminal device 1 and PTT server device 2 via a base station (not shown).

Figure 2:
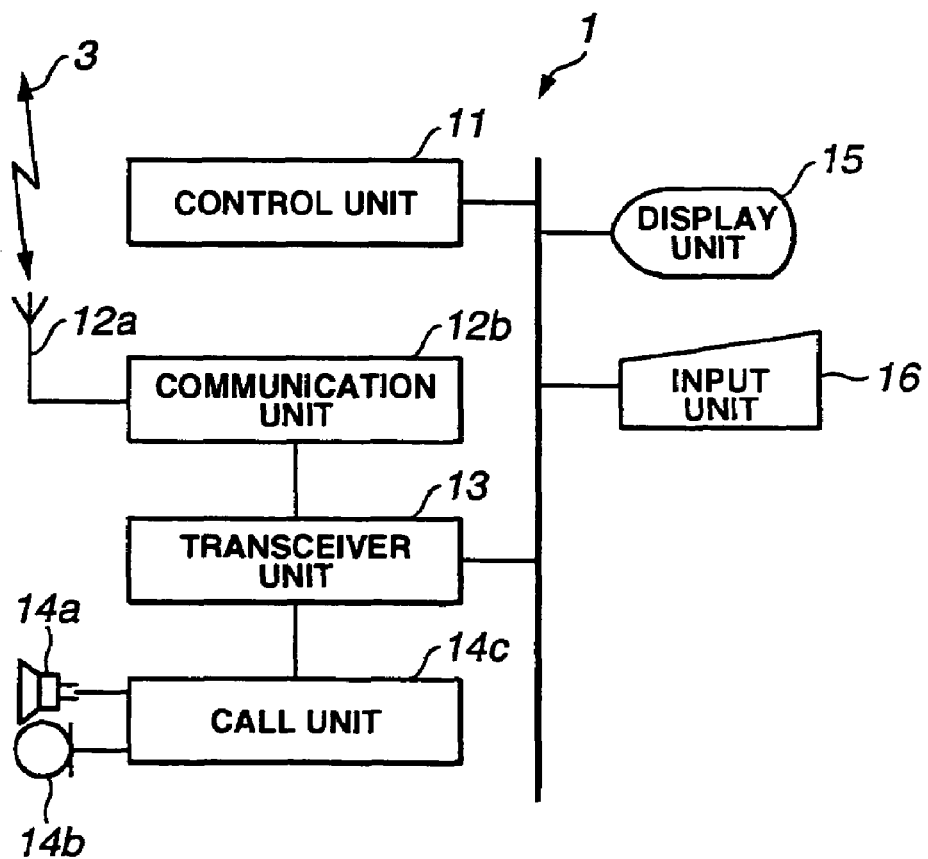
FIG. 2 is a block diagram showing the constitution of a mobile communication terminal device according to the embodiment of the present invention.

FIG. 2 is a block diagram showing the constitution of a mobile communication terminal device 1. The mobile communication terminal device 1 comprises a control unit 11 for controlling the whole device, an antenna 12a for transmitting and receiving radio waves to and from a base station, a communication unit 12b, a transceiver unit 13, a speaker 14a, a microphone 14b, a call unit 14c, a display unit 15, and an input unit 16.

FIG. 3 is a block diagram showing the constitution of the PTT server device 2. The PTT server device 2 comprises a control unit 21 for controlling the whole of the device, a communication unit 22 for transmitting and receiving calls to and from a base station, a PTT session data storage unit 23, and a PTT session management unit 24

PTT session data 23a is stored in the PTT session data storage unit 23. FIG. 4 shows an example of the format of the PTT session data 23a. The PTT session data 23a consists of a set of information of a PTT session identifier 23b, a main terminal device identifier 23c, an additional terminal device identifier 23d, and a floor-allocation terminal device identifier 23e and expresses the attributes of one established PTT session by means of one set of information. Further, the PTT session data 23a is not limited to the above set of information and may include other information.

The PTT session identifier 23b is information that identifies the established PTT session. The main terminal device identifier 23c is information that identifies the mobile communication terminal device 1 that has requested the establishment of the PTT session that is identified by the PTT session identifier 23b. The additional terminal device identifier 23d is information that requests participation according to the main terminal device identifier 23c in the PTT session that is identified by the PTT session identifier 23b and identifies one or a plurality of mobile communication terminal devices 1 that participate in the session.

Here, the mobile communication terminal device 1 that is identified by the main terminal device identifier 23c and the mobile communication terminal device 1 that is identified by the additional terminal device identifier 23d are called members of the PTT session that is identified by the PTT session identifier 23b.

Further, the floor-allocation terminal device identifier 23e is information that identifies one mobile communication terminal device 1 that is a member of the PTT session which is identified by the PTT session identifier 23b and to which the floor has been allocated. When a mobile communication terminal device 1 to which the floor is allocated does not exist, the fact that no allocation has been made is stored in the floor-allocation terminal device identifier 2e.

FIG. 4 shows an example in which a PTT session in which the PTT session identifier 23b is identified by "A" and a PTT session in which the PTT session identifier 23b is identified by "B" are established.

The main terminal device identifier 23c of a PTT session in which the PTT session identifier 23b is identified by "A" is "P" and the additional terminal device identifier 23d for the session is "Q". Further, the floor-allocation terminal device identifier 23e of this session is "P". That is, it is shown that the session is established in accordance with a request of the mobile communication terminal device 1 that is identified by the identifier "P", the mobile communication terminal device 1 that is identified by the identifier "Q" is participating in the session, and the floor of the session has been allocated to the mobile communication terminal device 1 that is identified by the identifier "P".

On the other hand, the main terminal device identifier 23c of the PTT session in which the PTT session identifier 23b is identified by "B" is "X" and the additional terminal device identifier 23d of the session is "Y,Z". Further, the floor-allocation terminal device identifier 23e of the session is "(unallocated)". That is, it is shown that the session is established in accordance with the request of the mobile communication terminal device 1 that is identified by the identifier "X", the mobile communication terminal device 1 that is identified by the identifier "Y" and the mobile communication terminal device 1 that is identified by the identifier "Z" are participating in the session and the floor of the session has not been allocated to any member of the session.

The operation of each part of the mobile communication terminal device 1 according to the embodiment of the present invention which is constituted as detailed above will now be illustrated with reference to FIG. 2

First, the communication unit 12b outputs a high frequency signal received by the antenna 12a to the transceiver 13 and the high-frequency signal that is outputted by the transceiver unit 13 is transmitted by the antenna 12a.

The transceiver unit 13 amplifies, frequency-converts, and demodulates the high frequency signal from the communication unit 12b, sends the digital speech signal thus obtained to the call unit 14c and sends a control signal that contains an incoming signal from the communication unit 12b to the control unit 11. In addition, a control signal that contains a digital speech signal that is outputted by the call unit 14c and an incoming call signal that is outputted by the control unit 11 is modulated, frequency, inverted and amplified to obtain a high frequency signal that is then sent to the communication unit 12b.

Thereafter, the call unit 14c converts the digital speech signal that is outputted by the transceiver unit 13 is converted to an analog speech signal that is then amplified and sent to the speaker 14a. Further, the analog speech signal that is outputted by the microphone 14b is then amplified, converted to a digital speech signal and then transmitted to a transceiver unit 13. The call unit 14c also performs echo canceling to prevent howling that is produced as a result of speech produced by the speaker 14a being inputted by the microphone 14b.

The display unit 15 is an LCD display device, for example, which is controlled by the control unit 11 to perform an operation to display letters, numbers, and image data, and so forth and the data thus displayed is switched by responding to an input operation or incoming signal from the input unit 16 and receiving an instruction from the control unit 11.

The input unit 16 comprises a plurality of keys that include number keys for designating the telephone number of a call partner and, when the keys of the input unit 16 are operated, the identifier corresponding with this key is communicated to the control unit 11 and displayed as letters or numbers on the display unit 15.

Figure 5:
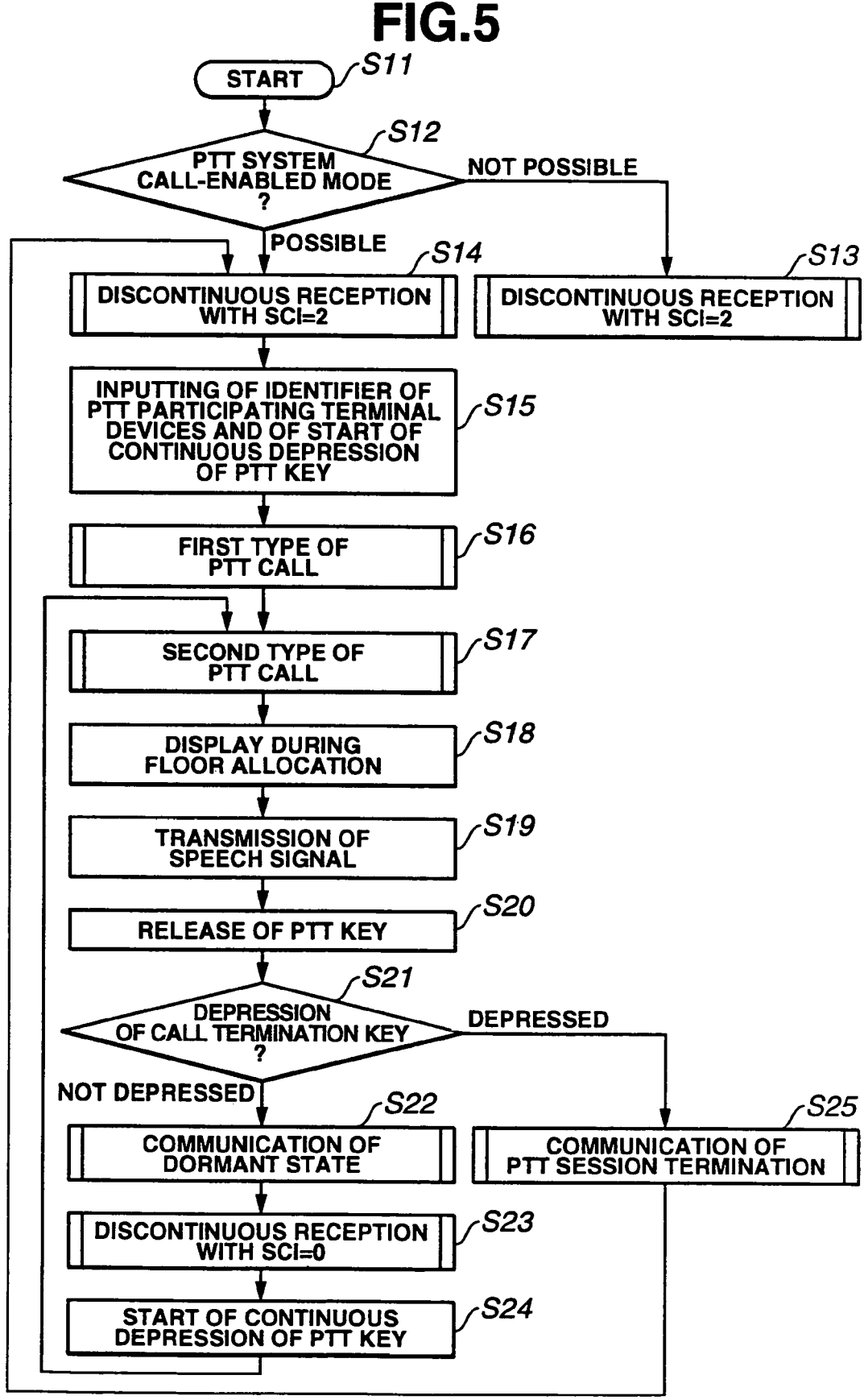
FIG. 5 is a flowchart showing the operation of a control unit of the mobile communication terminal device according to the embodiment of the present invention (the first of which is a request to establish a PTT session, and so forth)

Next, the operation to control the PTT-system call of the control unit 11 will be described first based on an operation to transmit a request to establish a PTT session and a floor request and speech signal that follow this request. FIG. 5 shows a flowchart of an operation to transmit a request to establish the PTT session of the control unit 11 and a floor request and speech signal that follow the request.

The operation to transmit the request to establish the PTT session of the control unit 11 and the floor request and speech signal that follow the request starts the operation by starting up the power supply of the mobile communication terminal device 1 (step S11) and checks whether a mode permitting a PTT-system call has been established (step S12). The mode is established by a predetermined key operation of the input unit 16 and the established mode is stored in a predetermined storage unit in the control unit 11. When a mode in which a PTT-system call is not possible has been established, discontinuous reception is performed by setting the SCI (Slotted Cycle Index) at 2 (step S13).

Here, the SCI is an index representing the discontinuous reception cycle and the discontinuous reception cycle (T) is calculated by means of the following equation in accordance with the SCI (i).

$$T = 2^i \times 1.28 \text{ (seconds)}. \qquad \text{Equation 1}$$

By setting the SCI at 2, when a mode in which a PTT-system call is not possible has been established, the discontinuous reception cycle is set relatively long and discontinuous reception can be performed with a focus reducing the amount of electric power consumed.

On the other hand, when a mode permitting a PTT-system call is established in S12, the control unit 11 performs discontinuous reception by setting the SCI at 2 (step S14) and the identifiers of one or a plurality of mobile communication terminal devices 1 seeking participation in the PTT system call, for example, the telephone numbers of these devices, are inputted and the start of the continuous depression of a predetermined PTT system calling key is inputted (step S15). Here, the inputting of the identifier of the mobile communication terminal device 1 may be performed by selecting a predetermined full name or group name or the like of an address book storage unit (not shown).

Thereafter, the control unit 11 transmits a request to establish a first type of call, that is, a PTT session establishment request, by taking, as the argument, the identifier of one or a plurality of mobile communication terminal devices 1 seeking participation in the PTT-system call that is inputted in step S15 (step 16). After a signal to the effect that the PTT session has been established has been received from the PTT server device 2, the control unit 11 transmits a second type of call, that is, a floor-allocation request, to the PTT server device 2 (step S17).

After the signal to the effect that the allocation of the floor has been approved has been received by the PTT server device 2, the control unit 11 establishes the channel if an individual packet-communication channel has not been established between the control unit 11's own device and the standby base station. Further, the fact that the allocation of the floor has been approved by the PTT server device 2 is indicated by providing a predetermined display in a predetermined position on the display unit 15 (step S18).

Further, the control unit 11 controls the transceiver unit 13 and transmits a signal that is produced by converting an analog speech signal inputted by the microphone 14b to a digital speech signal to the PTT server device 2 via the individual packet communication channel established in step S17 (step S19).

When the depression of a predetermined PTT system calling key whose continuous depression was started in S15 is cancelled (step S20), the control unit 11 terminates the display regarding the approval by the PTT server device 2 of the floor allocation performed in step S18 and then checks whether a predetermined PTT system call termination key has been depressed (step S21). When the call termination key has not been depressed, the control unit 11 communicates the fact that the PTT-system call is in a dormant state, that is, that the transmission of the speech signal by the control unit 11's own device has ended, to the PTT server device 2 (step S22).

Further, the operation of checking whether the PTT system call termination key has been depressed in step S21 may also be performed following the operation of step S22 (described subsequently) and during the operation of step S23 (described subsequently).

Thereafter, the control unit 11 performs discontinuous reception by setting the SCI at 0 (step S23). Here, by setting the SCI at 0, it is possible to receive the speech signal that is transmitted by the mobile communication terminal device 1 seeking participation in the PTT system call with a short wait time in step S15, as will be described subsequently. Further, when the continuous depression of the PTT system calling key is started (step S24), the processing returns to the operation to transmit the second type of call of step S17, that is, a floor request, to the PTT server device 2 and subsequent operations.

On the other hand, when the call termination key is depressed in step S21, the control unit 11 communicates the fact that the PTT session established in step S16 has terminated to the PTT server device 2 (step S25), whereupon the processing returns to step S14 and a discontinuous reception operation in which the SCI is set at 2 is performed.

Figure 6:
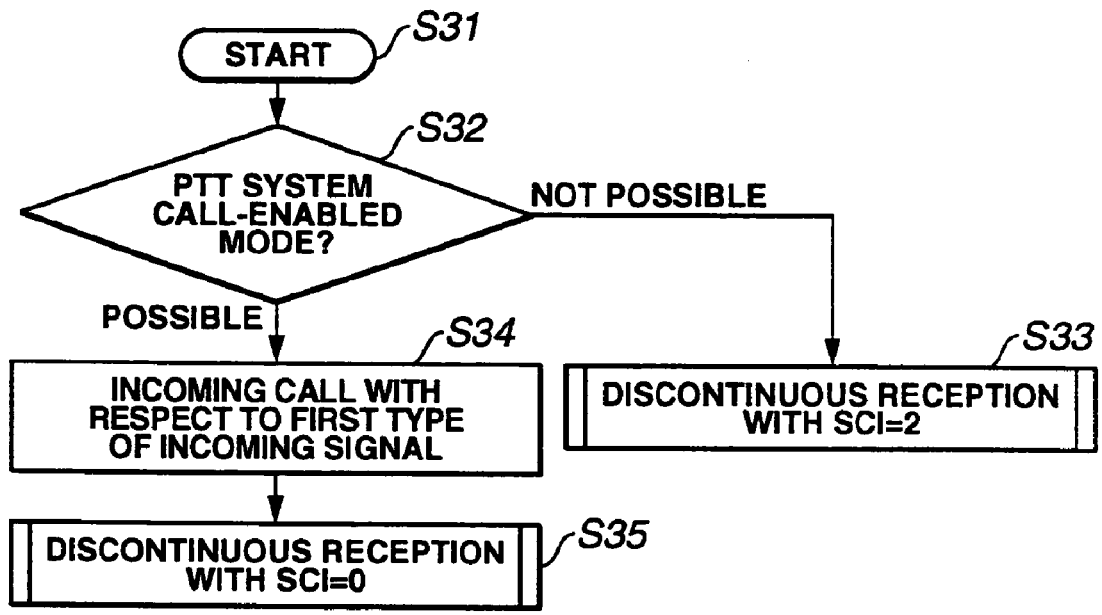
FIG. 6 is a flowchart showing the operation of the control unit of the mobile communication terminal device according to the embodiment of the present invention (the second of which is participation in the PTT session)

An incoming call operation with respect to the first type of call of the control unit 11, that is, an operation to request participation in a PTT-system call and participate in the PTT session of the call will be described next. FIG. 6 shows a flowchart of an incoming call operation with respect to a first type of call of the control unit 11. The incoming call operation with respect to the first type of call of the control unit 11 starts the operation as a result of receiving a first type of incoming signal, that is, an incoming signal that is transmitted by the PTT server device 2 in correspondence with the first type of call (step S31). Further, it is checked whether a mode permitting a PTT-system call has been established (step S32). When a mode in which a PTT-system call is not possible has been established, discontinuous reception is performed by setting the SCI at 2 (step S33) and the operation for the first type of incoming signal that is received is not performed.

On the other hand, when a mode permitting a PTT-system call has been established in step S32, the control unit 11 calls in the received first type of incoming signal (step S34), sets the SCI at 0 and performs discontinuous reception (step S35).

The operation to request the floor of the PTT session in which the control unit 11's own device participates and which is established on the basis of a first type of call by another device of the control unit 11 and to transmit a speech signal will be described next. FIG. 7 shows a flowchart for an operation to request the floor of the PIT session in which the control unit 11's own device participates and which is established on the basis of a first type of call by another device of the control unit 11 and to transmit a speech signal. Further, this operation includes the same operation as the operation to request the establishment of a PTT session of the control unit 11 shown by the flowchart in FIG. 5 and to transmit the floor request and speech signal that follow the PTT-session establishment request. The same reference numerals have been assigned to the same operation and a description has therefore been omitted.

The operation to request the floor of the PTT session in which the control unit 11's own device participates and which is established on the basis of the first type of call by another device of the control unit 11 and to transmit a speech signal starts an operation in accordance with the incoming call operation with respect to the first type of call shown in the flowchart in FIG. 6 (step S41), inputs the start of the continuous depression of a predetermined PTT system calling key (step S42) and performs the operation of the second type of call of step S17 and subsequent operations. Further, when a predetermined PTT system call termination key is depressed in step S21, the control unit 11's own device communicates the withdrawal from the PTT session in which the device has participated to the PTT server device 2 (step S43) and performs discontinuous reception by setting the SCI at 2 (step S44).

Figure 8:
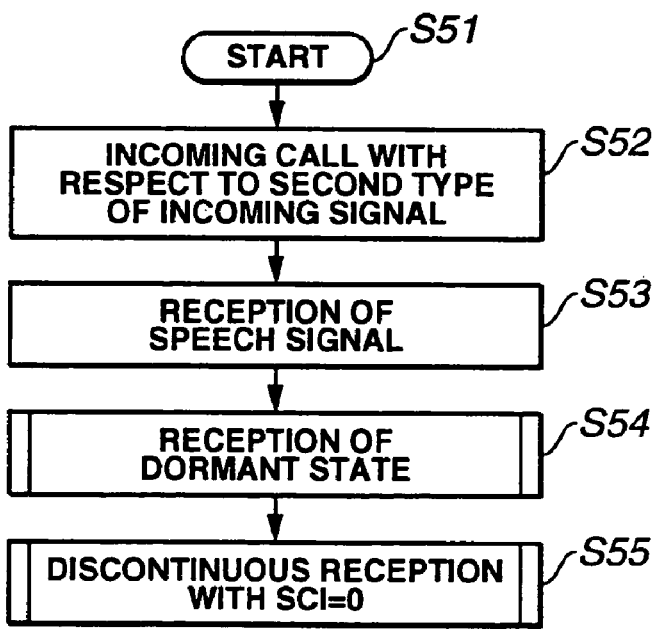
FIG. 8 is a flowchart showing the operation of the control unit of the mobile communication terminal device according to an embodiment of the present invention (the fourth of which is PTT system call reception).

Next, an operation to receive an incoming call with respect to the second type of incoming signal of the control unit 11, that is, the incoming signal that is transmitted by the PTT server device 2 in correspondence with the second type of call and to receive a speech signal that follows the incoming call operation will be described next. FIG. 8 shows a flowchart for an operation to receive an incoming call with respect to the second type of incoming signal of the control unit 11 and to receive the speech signal that follows the incoming call operation.

The operation to receive an incoming call with respect to the second type of incoming signal of the control unit 11 and to receive the speech signal that follows the incoming call starts the operation as a result of receiving the second type of incoming signal (step S51) and performs an incoming call operation with respect to the incoming signal (step S52). As a result of the incoming call operation, in cases where an individual packet communication channel has not been established between the control unit 11's own device and the standby base station, the channel is established.

Here, because the control unit's own device performs discontinuous reception with the SCI set at 0 in accordance with the operation in step S23 of FIG. 5 or in step S35 of FIG. 6 before receiving the second type of incoming signal, the time required to establish the individual packet communication channel following reception of the incoming signal can be shortened and the call can be started with a short wait time.

Further, the control unit 11 controls the transceiver unit 13 to receive the digital speech signal that is transmitted by the PTT server device 2 via the individual packet communication channel established in step S52 and continues the operation to output a signal, which is produced by converting the speech signal to an analog speech signal, from the speaker 14a (step S53). Further, the fact that the PTT-system call is in a dormant state is received from the PTT server device 2 (step S54) and discontinuous reception is performed by setting the SCI at 0 (step S55).

Next, the operation of the PTT server device 2 will be described with reference to FIG. 3. First, the communication unit 22 transmits the signal from the wireless communication network 3 to the control unit 21 and the signal from the control unit 21 is transmitted to the wireless communication network 3.

Next, the operation of the PTT session management unit 24 will first be described on the basis of the processing operation for the first type of call, that is, the operation to establish the PTT session. The processing operation for the first type of call of the PTT session management unit 24 starts the operation as a result of receiving the first type of call by taking, as the argument, the identifier of one or a plurality of mobile communication terminal devices 1 seeking participation in the PTT-system call from the mobile communication terminal device 1.

Further, the PTT session management unit 24 additionally stores, in the PTT session data 23a, a set of information that is produced by setting the identifier of the called mobile communication terminal device 1 as the main terminal device identifier 23c, the identifier of one or a plurality of mobile communication terminal devices 1 seeking the aforementioned participation as the additional terminal device identifier 23d, information that uniquely identifies the established PTT session as the PTT session identifier 23b and "(unallocated)" as the floor-allocation terminal device identifier 23e.

In addition, the PTT session management unit 24 transmits the first type of incoming signal to one or a plurality of mobile communication terminal devices 1 seeking the aforementioned participation. Further, when an incoming call signal that is transmitted for the first type of incoming signal is received from the mobile communication terminal device 1, a signal to the effect that a PTT session has been established is transmitted to the mobile communication terminal device 1 that made the call.

Thereafter, the operation to process the second type of call of the PTT session management unit 24, that is, a floor allocation operation, will be described next. The operation to process the second type of call of the PTT session management unit 24 starts the operation as a result of receiving the second type of call from the mobile communication terminal device 1. Further, attribute information on the PTT session that the mobile communication terminal device 1 that transmitted the call is a member is retrieved from the PTT session data 23a.

Further, when "(unallocated)" is stored in the retrieved floor-allocation terminal device identifier 23e, the PTT session management unit 24, updates and stores the identifier of the mobile communication terminal device 1 that transmitted the call in the floor-allocation terminal device identifier 23e.

Further, the second type of incoming signal is transmitted to a mobile communication terminal device 1 other than the mobile communication terminal device 1 that transmitted the call and which is a member of the PTT session. Then, when an incoming call signal that is transmitted with respect to the second type of incoming signal is received from the mobile communication terminal device 1, the PTT session management unit 24 transmits a signal to the effect that the floor allocation has been approved to the mobile communication terminal device 1 that made the call.

Thereafter, the PTT session management unit 24 transmits a speech signal that was transmitted by the mobile communication terminal device 1 that transmitted the call to a mobile communication terminal device 1 other than the mobile communication terminal device 1 that transmitted the call and which is a member of the PTT session.

The operation by the PTT session management unit 24 upon receiving a dormant-state communication will be described next. Upon receiving a dormant-state communication that is transmitted by the mobile communication terminal device 1, the PTT session management unit 24 retrieves attribute information on the PTT session of which the mobile communication terminal device 1 that transmitted the communication is a member from the PTT session data 23a. Further, "(unallocated)" is updated and stored in the retrieved floor-allocation terminal device identifier 23e.

In addition, the PTT session management unit 24 is a member of the PTT session and transmits a communication regarding the dormant state to a mobile communication terminal device 1 other than the mobile communication terminal device 1 that transmitted the communication. Further, after a predetermined amount of time has elapsed, the individual packet communication channel that has been established between the mobile communication terminal device 1 that is a member of the PTT session and the base station with which the respective devices communicate is cancelled.

The operation when a communication regarding termination of the PTT session of the PTT session management unit 24 is received will be described next. Upon receipt of the communication regarding termination of the PTT session that was transmitted by the mobile communication terminal device 1, the PTT session management unit 24 retrieves attribute information on the PTT session in which the identifier of the mobile communication terminal device 1 that transmitted the communication is stored in the main terminal device identifier 23c from the PTT session data 23a.

Further, the attribute information on the PTT session is deleted from the PTT session data 23a. As a result, all the mobile communication terminal devices 1 that are members of the PTT session are withdrawn from the PTT session and are therefore no longer members of the PTT session. Further, if individual packet communication channels have been established between mobile communication terminal devices 1 that are members of the PTT session and the base station with which the respective devices communicate, these channels are cancelled.

The operation when a communication regarding withdrawal from the PTT session of the PTT session management unit 24 is received will be described next. Upon receipt of the communication regarding withdrawal from the PTT session that was transmitted by the mobile communication terminal device 1, the PTT session management unit 24 retrieves, from the PTT session data 23a, attribute information on the PTT session in which the identifier of the mobile communication terminal device 1 that transmitted the communication is stored in the additional terminal device identifier 23d.

The identifier of the mobile communication terminal device 1 that transmitted the communication is deleted from the additional terminal device identifier 23d and the attribute information on the PTT session is updated and stored in the PTT session data 23a. Further, if an individual packet communication channel between the mobile communication terminal device 1 that transmitted the communication and the base station with which the respective devices communicate has been established, this channel is cancelled.

Further, the cycle in which the base station transmits a first type of incoming signal is a discontinuous reception cycle for which the SCI is set at 2 and the cycle for transmitting the second type of incoming signal is a discontinuous reception cycle for which the SCI is set at 0. However, the present invention is not limited to such cycles. For example, the cycle for transmitting any of the incoming signals may also be a discontinuous reception cycle for which the SCI is set at 0, for example.

In this case, when the base station transmits the first type of incoming signal once, there is the possibility that the mobile communication terminal device 1 will not receive the first type of incoming signal. As a result, the base station may transmit the first type of incoming signal four times in a cycle that is equal to the discontinuous reception cycle for which the SCI is set at 0. Further, in cases where the base station does not receive an incoming call signal from the mobile communication terminal device 1 with respect to the first type of incoming signal thus transmitted, the first type of incoming signal may be repeatedly transmitted.

Furthermore, the discontinuous reception cycle before the mobile communication terminal device 1 requests the establishment of the PTT session or participates in the PTT session and the discontinuous reception cycle following the establishment of the PTT session that was requested by the mobile communication terminal device 1 or after participation in the PTT session are not limited to the discontinuous reception cycles mentioned earlier. The former discontinuous reception cycle may be longer than the latter discontinuous reception cycle.

The above description involved one mobile communication terminal device 1 requesting the establishment of only one PTT session or participation in one PTT session. However, the present invention is not limited to such an arrangement. The establishment of a plurality of PTT sessions may be requested or participation in a plurality of PTT session may be possible. In this case, with the exception of a request to establish a PTT session, the communication between all the mobile communication terminal devices 1 and the PTT server device 2 may include the PTT session identifier 23b. The present invention is not limited to the above constitution and a variety of modifications are possible.

What is claimed is:
1. A method for a mobile communication terminal device having a push-to-talk system call function, the method comprising:
   becoming a member of a push-to-talk session;
   obtaining the floor in the push-to-talk session;
   transmitting a speech signal while the floor is obtained in the push-to-talk session;
   releasing the floor in the push-to-talk session; and
   upon releasing the floor, waking up discontinuously, by waking up each time a second discontinuous reception cycle elapses, if the mobile communication terminal remains a member of the push-to-talk session; and waking up discontinuously, by waking up each time a first discontinuous reception cycle elapses, when the mobile communication terminal is not a member of the push-to-talk session;

wherein the second discontinuous reception cycle is shorter than the first discontinuous reception cycle.

2. The method according to claim 1, further comprising terminating the push-to-talk session, and then waking up discontinuously, by waking up each time the first discontinuous reception cycle elapses.

3. The method according to claim 1, further comprising withdrawing from the push-to-talk session, and then waking up discontinuously, by waking up each time the first discontinuous reception cycle elapses.

4. The method according to claim 1, wherein becoming a member of the push-to-talk session comprises identifying at least one other mobile communication terminal device to be a member of the push-to-talk session, and transmitting a push-to-talk session establishment request which includes information identifying the at least one other mobile communication terminal device.

5. The method according to claim 4, further comprising terminating the push-to-talk session, and then waking up discontinuously, by waking up each time the first discontinuous reception cycle elapses.

6. The method according to claim 1, wherein becoming a member of the push-to-talk session comprises joining a push-to-talk session requested by another mobile communication terminal, and then waking up discontinuously, by waking up each time the second discontinuous reception cycle elapses.

7. The method according to claim 6, further comprising withdrawing from the push-to-talk session, and then waking up discontinuously, by waking up each time the first discontinuous reception cycle elapses.

8. The method according to claim 1, further comprising receiving a speech signal from another mobile communication terminal which has obtained the floor in the push-to-talk session, and then waking up discontinuously, by waking up each time the second discontinuous reception cycle elapses, upon release of the floor.

9. The method according to claim 1, wherein respective lengths T, in seconds, of the first discontinuous reception cycle and the second discontinuous reception cycle are set in accordance with the equation:

$$T = 2^i \times 1.28,$$

where i is a respective slot cycle index for each of the first and second discontinuous reception cycles.

10. The method according to claim 9, wherein the slot cycle index i is 2 for the first discontinuous reception cycle and the slot cycle index i is 0 for the second discontinuous reception cycle.

11. A method for a mobile communication terminal device having a push-to-talk system call function, the method comprising:

becoming a member of a push-to-talk session;

receiving a speech signal from another mobile communication terminal which has obtained the floor in the push-to-talk session;

upon release of the floor by said another mobile communication terminal, waking up discontinuously, by waking up each time a second discontinuous reception cycle elapses, if the mobile communication terminal remains a member of the push-to-talk session; and waking up discontinuously, by waking up each time a first discontinuous reception cycle elapses, when the mobile communication terminal is not a member of the push-to-talk session;

wherein the second discontinuous reception cycle is shorter than the first discontinuous reception cycle.

12. A method for a mobile communication terminal device having a push-to-talk system call function, the method comprising:

determining whether a mode in which a push-to-talk session is permitted is established, and then waking up discontinuously, by waking up each time a first discontinuous reception cycle elapses;

becoming a member of a push-to-talk session, only if it is determined that the mode in which a push-to-talk session is permitted is established;

obtaining the floor in the push-to-talk session;

transmitting a speech signal while the floor is obtained in the push-to-talk session;

releasing the floor in the push-to-talk session; and upon releasing the floor, waking up discontinuously, by waking up each time a second discontinuous reception cycle elapses, if the mobile communication terminal remains a member of the push-to-talk session; and waking up discontinuously, by waking up each time the first discontinuous reception cycle elapses, when the mobile communication terminal is not a member of the push-to-talk session;

wherein the second discontinuous reception cycle is shorter than the first discontinuous reception cycle.

* * * * *